(Model.)

J. J. MEIERDIRCKS.
POTATO DIGGER.

No. 252,687.

Patented Jan. 24, 1882.

Witnesses:
O. J. Bailey
S. O. Christian

Inventor:
Joseph J. Meierdircks
by J. S. Berber
Atty.

UNITED STATES PATENT OFFICE.

JOSEPH J. MEIERDIRCKS, OF CINCINNATI, OHIO.

POTATO-DIGGER.

SPECIFICATION forming part of Letters Patent No. 252,687, dated January 24, 1882.

Application filed March 7, 1881. (Model.)

*To all whom it may concern:*

Be it known that I, JOSEPH J. MEIERDIRCKS, of Cincinnati, in the county of Hamilton and State of Ohio, have invented a new and useful Improvement in Potato-Diggers, which improvement is fully set forth in the following specification and accompanying drawings, in which—

Figure 1:
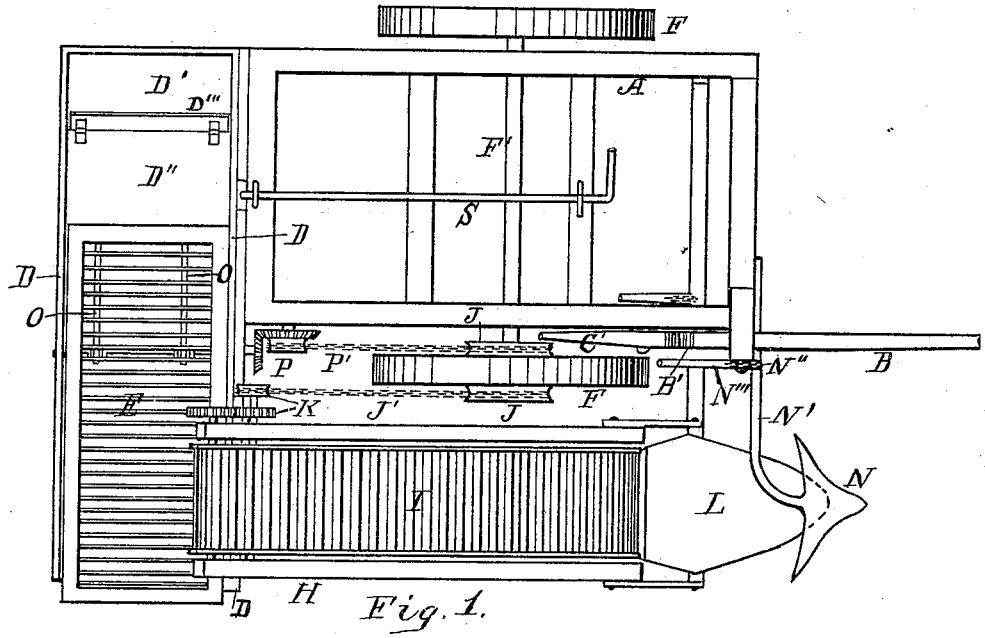
Figure 2:
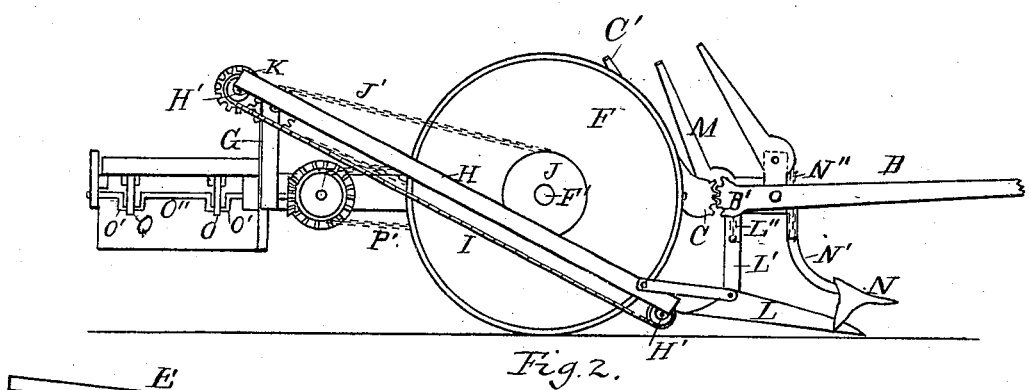
Figure 3:
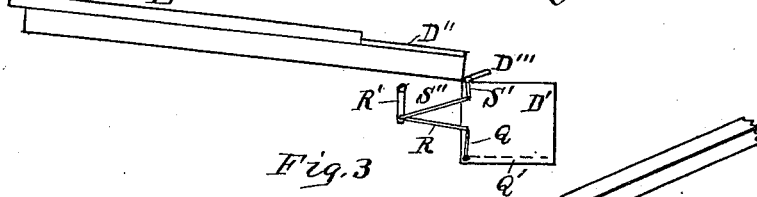
Figures 4, 5:
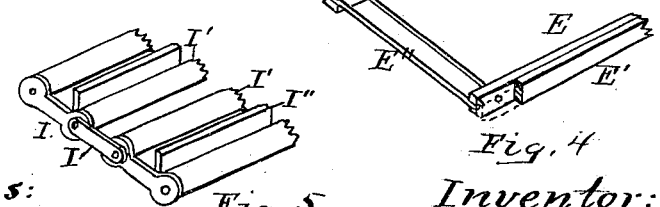

Figure 1 is a top view of the potato-digger. Fig. 2 is a side elevation. Fig. 3 is a cross vertical sectional view through Fig. 1. Fig. 4 is a detail perspective view of the sieve or screen. Fig. 5 is a detail view of the elevator.

The object of my invention is to provide a simple and effective potato-digger.

In the accompanying drawings, A represents the frame of the machine, having at one side a tongue, B, hinged to the corner. The rear end of the tongue has a quadrant, B', containing cogs which mesh with a like quadrant, C, on a lever, C'. By this means the forward end of the frame can be raised or lowered. The rear end of the frame A has a cross-frame, D, which extends over the right side of the main frame A. This cross-frame carries at the left end a box, D', and at the right end a transverse screen, E. The frames thus constructed are mounted on wheels F, secured to the shaft F'.

At the forward end of the rear cross-frame, D, two standards, G, project upwardly and are joined by a suitable cross-piece. On this rests the rear end of a frame, H, which has at each end a transverse shaft, H', and pulleys, over which an endless belt or elevator, I, operates. The construction of this elevator is shown more fully by reference to Fig. 5. The elevator is operated by a pulley, J, on the side of the wheel F, which transmits motion through the belt or chain J' to the gearing K on the upper end of the elevator.

To the lower and forward end of the elevator a shovel, L, is secured. This is constructed with a long tapering point, with the sides bent upwardly. The rear end of this shovel is somewhat below the upper surface of the elevator I. This shovel is intended to enter the earth and raise up the dirt containing the potatoes, and the elevator at the rear will then take off the earth and convey it from the shovel. The shovel is regulated by means of an arm, L', by which it is secured to the machine. A rope or chain, L", secured to a lever, M, above and to the arm L' below, enables the driver to raise or lower the shovel at will. Directly before this shovel is a plow, N, having a long point, with two ears projecting backwardly. This is also secured to the forward end of the machine by an arm, N', and a chain, N", secured to the arm N' and attached above to the lever N''', enables the operator to regulate this plow. The object of this is to rest on the ground in front of the shovel L, so that the weeds, potato-vines, &c., which would otherwise clog the elevator will be caught and turned aside, thus enabling the machine to do more effective work.

The transverse sieve at the rear of the machine rests on the frame D, and has two arms, O, beneath, hinged to the sieve, the opposite ends being secured to cranks O' on the shaft O", which is operated by means of the gearing P and the belt or chain P', running to the pulley J on the wheel F.

The box D' on the rear of the frame A has a bottom, Q', hinged at one side, and from this pivotal point an arm, Q, extends upwardly. At the upper end of this arm a rod, R, is hinged, which connects with the lower end of the crank-arm R', which extends down from the horizontal rod S on the frame A.

At the lower end of the table D", at the edge of the box D', a leaf, D''', is hinged at one side, and from the side a crank-arm, S', extends downward, having its lower end hinged to a rod, S", whose opposite end is also hinged to the lower end of the crank-arm R' on the horizontal rod. The bottom Q and the leaf T are so connected with each other by means of the rods R S" that when the bottom is closed, as shown, the leaf T is turned down, so that the potatoes can readily pass from the table D" down in the box D'; but when the box is full the driver, by simply turning the rod S, can open the box-bottom Q and empty the box. At the same time the leaf T turns up and prevents the potatoes from passing down into the box.

The sieve is constructed in a peculiar manner, as shown by reference to Fig. 4. One side of the sieve has holes or perforations which pass only half-way through. The piece on the opposite side has perforations entirely through, and a cap, E', is secured over this face. The design is to take off the cap E' and permit each alternate wire E″ to be taken out, or more, if desired. The operator can thus make a sieve of any sized mesh or suitable for any soil at pleasure.

The slats forming the elevator are also constructed in a peculiar manner. As in the ordinary elevator, the slats I′ forming the links are placed some distance apart, so as to allow dirt to pass down between them. In addition to this I have formed a flange, which projects upward from each slat, which aids in more effectually elevating the dirt as well as the potatoes. The links I hold the slats together.

What I claim is—

The transverse sieve E, constructed of side pieces having wires E″, which pass entirely through one side piece and half the distance through the opposite side piece, a cap, E′, being adapted to fit over the one side piece covering the ends of the wires, as herein set forth.

JOSEPH J. MEIERDIRCKS.

Witnesses:
S. STROBHART,
J. S. ZERBE.